March 19, 1946.    P. B. KELLER ET AL    2,397,076
SECURING DEVICE
Original Filed Jan. 15, 1944
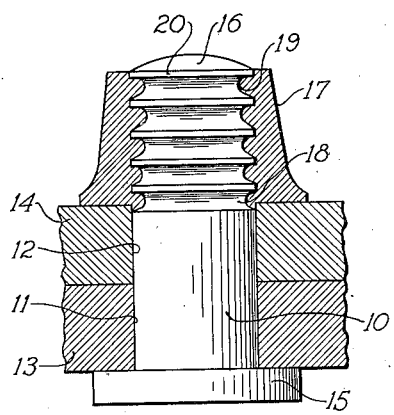
Fig. 1
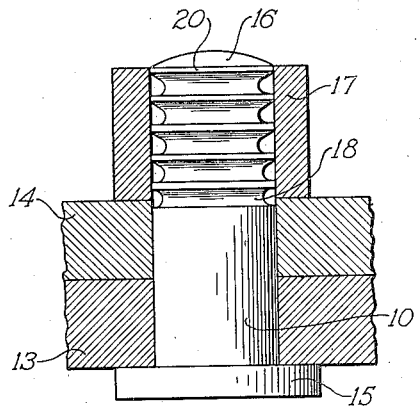
Fig. 2
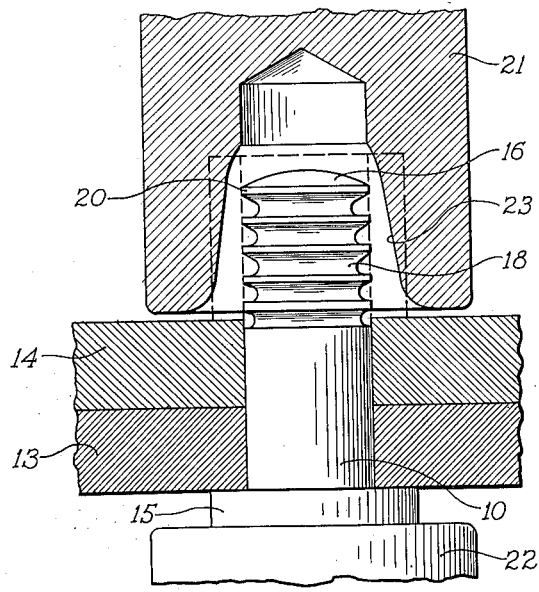
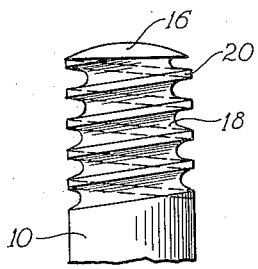
Fig. 4
Fig. 3
INVENTORS.
Philip B. Keller and
Donald Jelinek
BY
Lyon & Lyon
Attorneys Patented Mar. 19, 1946

2,397,076

UNITED STATES PATENT OFFICE 2,397,076

SECURING DEVICE

Philip B. Keller, Santa Monica, and Donald Jelinek, Los Angeles, Calif., assignors to North American Aviation, Inc.

Original application January 15, 1944, Serial No. 518,376. Divided and this application March 14, 1945, Serial No. 582,668

3 Claims. (Cl. 78—46)

This invention relates to securing devices of the composite rivet type wherein a hardened steel rivet pin is provided at one end with an integral head and at its other end with a head formed by swaging a malleable collar around said other end. The primary object of the invention is to provide, in such a composite rivet, a higher tensile load-bearing strength than has been available in prior securing devices of this type.

This application is a division of our application Serial No. 518,376, filed January 15, 1944.

The further object of the invention is to provide a composite rivet which, although giving increased strength, may be set or formed as easily as the earlier type of composite rivet.

Another object of the invention is to provide a composite rivet which permits the use of a mild steel collar instead of the soft aluminum now employed.

A further object of the invention is to provide a composite rivet having a greater tensile strength than in a standard bolt of the same cross sectional area.

Like reference characters designate similar parts in the several views of the drawing, wherein:

Fig. 1 is a view, partially in section, of a composite rivet embodying our invention, together with parts secured together thereby.

Fig. 2 is a view of the rivet pin and collar assembled with the parts to be secured together, before attachment of the collar to the pin.

Fig. 3 is a view showing the final relationship between the rivet pin and the setting tool with the collar, in its original shape, indicated in broken lines.

Fig. 4 is a view of a modified form of the rivet pin.

As an example of one form in which the invention may be embodied, we have shown in the drawing a composite rivet including a hardened pin 10, preferably of steel, adapted to be extended through aligned openings 11 and 12 in a pair of members 13 and 14 to be secured together, having at one end an integral head 15 adapted to engage one of the members 13, 14, and having at its other end a grooved end portion 16 adapted to project beyond the members 13, 14, and to be secured by a collar 17.

The collar 17 is of malleable material and is impressed into a series of grooves 18 in the end portion 16 of the pin, forming annular teeth 19 in the collar which intermesh with the annular teeth 20 defined in the pin by the grooves 18.

In prior composite rivets of this general type, a single relatively deep groove is employed, and the collar is of soft aluminum in order that it may be pressed into such relatively deep groove. In the present invention, instead of the single groove, we provide a series of relatively shallow grooves. Consequently, less deformation of the collar is required in order to fill the groove, and we therefore find it possible to form the collar of mild steel, which is considerably stronger than aluminum.

The grooves 18 are made progressively deeper toward the end of the pin. Thus there is a minimum weakening of the pin in the central region thereof where the full tension load is carried, and the weakest section of the pin is at the outer end where the minimum tension load is carried.

A maximum increment of load is transferred to the pin from the collar at the outer end of the pin, and the increments of load transferred to the pin from the collar successively decrease toward the base of the tier of grooves. Since each succeeding cross section of the pin at the bottoms of the grooves 18, however (proceeding from the outer end of the pin toward the head), carries the accumulated load transmitted to the preceding teeth of the pin, there is a proper balance between the loads transmitted from the succeeding teeth 19 of the collar to the coacting teeth 20 of the pin and the loads transmitted successively from one cross section to another of the pin.

The collar 17 in its initial form, shown in Fig. 2, is a plain cylindrical ring. It is forced into the grooves 18 by applying axial pressure from a setting tool 21 while supporting the head of the rivet pin with a bucking bar 22. The setting tool 21 has an interior frusto-conical surface 23 which forces the collar radially inwardly as the tool is moved axially toward the pin. At the end of the setting stroke the tool assumes the position shown in Fig. 3. Because of the conical shape of the surface 23, the base region of the collar is forced inwardly only slightly while the outer region is forced inwardly a maximum distance. The progressively increasing depth of the grooves 18 accommodates the progressively greater compression of the collar toward its outer end. Consequently, there is practically no axial flow of the metal of the collar during the initial setting operation, the distortion being confined substantially to moving the inner region of the collar radially inwardly into the grooves 18. Thus it is possible to employ mild steel instead of soft aluminum and yet the amount of pressure required for setting the rivet is not substantially greater than that required in setting the aluminum collar of the earlier type of rivet.

The teeth 20 in their original form shown in Fig. 2 lean toward the end of the rivet pin as indicated. During the setting operation, however, and after the grooves are filled the component of force exerted downwardly by the setting tool upsets the teeth axially until they lean toward the head of the rivet as shown in Fig. 1. This increases the buttressing effect and gives greater load-bearing capacitay in the transfer of loads from the collar to the pin.

By employing a forming surface 23 that is frusto-conical, it is possible for the tool to be easily pulled away from the rivet after the head has been formed thereon. Thus it will be seen that the conical shape of the head and the progressively decreasing depth of the grooves 18 cooperate to produce a number of desirable results.

Instead of a plurality of teeth and grooves, a thread defining a continuous groove of increasing depth toward the end of the pin, as shown in Fig. 4 may be employed.

The cross sectional area of the teeth 20 is related to that of the teeth 19 in the ratio of the shear strength of the pin material to that of the collar.

We claim as our invention:

1. A device for attaching together a plurality of members having aligned openings therethrough, including a pin of hardened material extendable through such aligned openings, and having a headed portion for engaging one side of the assembled members, a continuous helical groove adjacent the end of the pin when extending beyond the assembled members, the groove being progressively greater in depth as it approaches the extremity of the pin remote from the headed portion thereof, and a collar of relatively soft malleable material adapted to surround the groove in the pin and to have portions thereof extended into the groove by flow of the material of the collar under compression.

2. The method of securing together a plurality of members having aligned openings which consists in inserting through said aligned openings a hardened pin having a head at one end thereof adapted to engage one side of said plurality of members when assembled and a continuous helical groove in the portion of the pin extending beyond the plurality of members when assembled, and which groove increases progressively in depth as it approaches the end of the pin opposite the headed end thereof, applying a collar of relatively soft malleable material to the grooved end of the pin, and then forcing portions of the collar into the groove by compression exerted on the collar.

3. The method of securing together a plurality of members having aligned openings which consists in inserting through said aligned openings a hardened pin having a head at one end thereof adapted to engage one side of said plurality of members when assembled and a continuous helical groove in the portion of the pin extending beyond the plurality of members when assembled, and which groove increases progressively in depth as it approaches the end of the pin opposite the headed end thereof, applying a collar of relatively soft malleable material to the grooved end of the pin, and then forcing portions of the collar into the groove and upsetting the teeth formed by the groove toward the headed end of the pin by compression exerted on the collar.

PHILIP B. KELLER.
DONALD JELINEK.